Nov. 23, 1965  K. B. VAN WOERT  3,218,858
STORAGE BATTERY LEVEL INDICATOR
Filed June 1, 1964
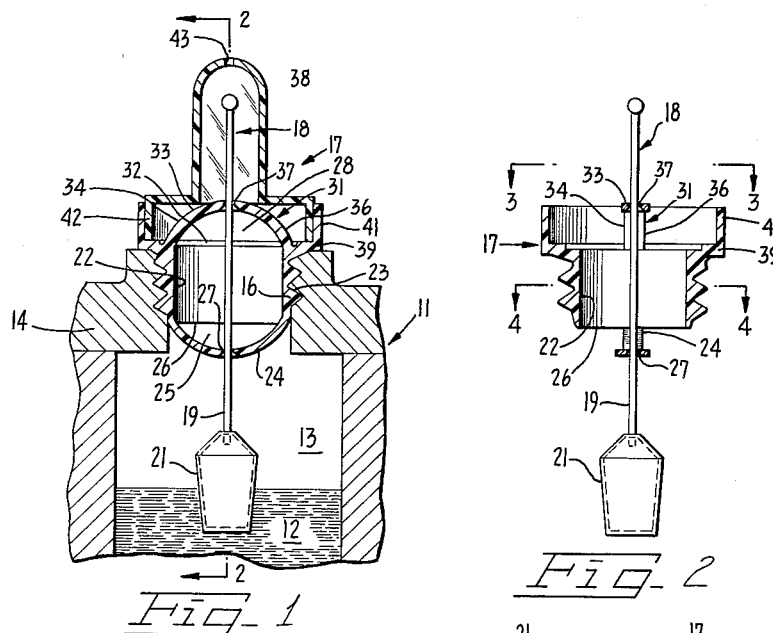
INVENTOR.
Kenneth B. Van Woert
BY
Gardner & Zimmerman
ATTORNEYS

United States Patent Office 3,218,858
Patented Nov. 23, 1965

3,218,858
STORAGE BATTERY LEVEL INDICATOR
Kenneth B. Van Woert, 870 Coleman Ave.,
Menlo Park, Calif.
Filed June 1, 1964, Ser. No. 371,569
3 Claims. (Cl. 73—306)

This invention relates generally to liquid level indicators for electrolytic storage batteries, and more particularly to a combination level indicator and vented filler plug.

Various devices have been heretofore provided which combine a liquid level indicator with a filler plug for the liquid access opening of a storage battery case, whereby it is not necessary to remove the filler plug in order to ascertain the level of the electrolyte liquid within the case. Many of these devices, however, have not obviated the need for unscrewing and removing the filler plug in the event that the liquid in the battery requires replenishing. Other devices which enable adding fluid to the battery without removal of the plug, have been found to be disadvantageous from the consideration of the ease and speed with which liquid can be introduced through the plug into the battery. These devices often involve a plurality of relatively small openings through which it is difficult to pass fluid in any appreciable quantities. In addition, some of these devices fail to provide suitable protection for the liquid access openings through the plug, whereby the device is susceptible to having foreign matter introduced into the interior of the storage battery.

In providing a combination level indicator and plug in accordance with the present invention, it must be appreciated that conventional batteries with which the device is to be used all have standard size filler openings. Consequently, in providing plug means for introducing fluid into the battery without removing the plug from the conventional opening there is an inherent limitation as to the size of the opening for passing fluid.

It is accordingly an object of the present invention to provide a combination filler plug and liquid level indicator device for engagement in the standard threaded opening of a conventional battery which enables access for replenishing liquid into the battery without having to remove the plug, and which provides an optimum size opening for fluid passage at a rapid rate.

It is another object of the present invention to provide a level indicator and filler plug of the type described wherein the liquid access openings are protected from deposits of deleterious foreign matter thereby preventing the introduction of same into the battery.

Still another object of the present invention is to provide a device of the type described which is simple and inexpensive to manufacture, and which is durable and reliable with regard to its operation as a level indicator.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a cross sectional side elevation view with portions broken away of a combination filler plug and liquid level device according to the present invention shown as mounted in operative position in the liquid access opening of a standard electrolytic storage battery.

FIGURE 2 is a cross sectional side elevation view taken along the plane of line 2—2 as shown in FIGURE 1.

FIGURE 3 is a cross sectional fragmentary plan view taken along the plane of line 3—3 as shown in FIGURE 2.

FIGURE 4 is a cross sectional fragmentary plan view taken along the plane of line 4—4 as shown in FIGURE 2.

FIGURE 5 is a fragmentary perspective view of the device depicting it when being used to replenish liquid into the battery.

FIGURE 6 is a longitudinal cross-sectional view of the tubular member of my device.

There is shown in the drawing a storage battery 11 of conventional design which accommodates a supply of electrolytic liquid 12 in each cell 13 thereof, with the top wall 14 of each cell being formed with a threaded filling opening 16 for periodically replenishing the electrolyte as required to maintain it at a satisfactory level. A combination level indicator and filler plug 17 constructed in accordance with the present invention is shown threadably engaged with the opening 16, and includes an indicator member 18 having a vertically movable stem 19 with a float 21 secured adjacent the lower end of the stem. In accordance with conventional devices of this type, the float 21 is suspended at the surface of the electrolyte 12, whereby the indicator 18 moves up or down in accordance with the level of the electrolyte whereby such level can be ascertained by visual inspection of the positioning of the upper end of the indicator.

Considering now the novel structural features of the instant device 17, there is provided a generally tubular member 22 formed for vertical positioning in the battery opening 16 and which as shown has an externally threaded surface 23 for engagement with the threads in the opening 16. A lower arcuate cross member 24 of narrow cross section extends generally diametrically across the tubular member 22 and is secured adjacent the lower end 26 thereof, the members 22 and 24 defining openings 25. The member 24 has a bearing aperture 27 therein through which the indicator stem 19 is slidably disposed. An arcuate upper cross member 31 extends across the tubular member 22 and is secured thereto adjacent the upper end 32 thereof, defining laterally accessible fluid openings 28 into the upper end of the tubular member. As shown, the member 31 has a central portion 33 axially positioned in relation to the tubular member, and has a pair of side portions 34 and 36 extending from the central portion 33 and being secured to diametrically opposite portions adjacent the upper end of the tubular member 22. A bearing aperture 37 is provided in the upper cross member 31 in vertical alignment with the aperture 27 in the lower member 24 and slidably receives the indicator stem 19 whereby the latter is afforded two point bearing support for unrestricted vertical sliding movement. Desirably the bearings are countersunk so as to reduce the bearing contact surface with the stem 19.

It will be appreciated that the arcuate shaped members 24 and 31 provide openings at the two ends of the plug member 17 which have a cross sectional area at least as large as the cross sectional area of the inner passage through the plug member. Consequently, the provision of the liquid level indicator does not interfere with the passage for replenishing battery liquid, which passage can be made almost as large as the standard battery opening. The only reduction in the size of the passage is in the relatively thin walls of the plug member 17. A further advantage of the arcuate shaped support members is that the bearing points for the stem 19 are spaced as far apart as possible, thus minimizing any tendency for the stem to twist or bind in the bearing apertures.

A transparent dome member 38 is removably mounted on the upper end of the tubular member 22 and forms a protective closure over the fluid openings in the tubular member. In more detail, an outwardly extending flange portion 39 is provided adjacent the upper end 32 of the tubular member 22 for seating on the upper surface of the battery 11, with an upwardly extending cylindrical extension 41 being secured to the flange 39. The extension 41 has a greater inside diameter than does the tubular member 22, and thus defines a generally cylindrical recess adjacent the upper end of the tubular member. The aforesaid dome member 38 has generally cylindrical side walls 42 adjacent the open lower end thereof, with the walls 42 being positionable in the aforesaid recess in sealing engagement with the extension 41. A vent opening 43 of relatively small size provides means for the escape of gasses accumulating from electrolytic action in the cell 13. The vertical position of the indicator 18 is visible through the dome 38, whereby the level of the liquid in the battery can be readily checked at a glance.

In order to replenish the liquid in the cell 13, it is not necessary with the instant device to unscrew it from the battery opening 16. Rather, the dome 38 is simply raised out of engagement with the extension 41 to provide access for liquid into the cell through the tubular member 22. In this regard, it is important to note that the arcuate shaped cross member 31 provides a relatively large and laterally accessible opening into the upper end of the tubular member 22. Consequently, as depicted in FIGURE 5, a conventional rubber tube 44 of a battery water syringe can be fully inserted into the tubular member 22 through the openings 28. Liquid from the tube 44 thereby is readily and rapidly passed through the lower openings 25, into the cell 13. When the dome 38 is positioned over the tubular member 22 as shown in FIGURE 1, the fluid passageway through the tubular member 22 is protected against deleterious foreign materials.

What is claimed is:

1. A battery level indicator plug comprising, in combination, a generally tubular housing formed for generally vertical positioning in a storage battery liquid access opening and having an upper outwardly flanged portion for engagement with the upper surface of the battery, said tubular member having an externally threaded surface adjacent the lower end thereof for threaded engagement in said battery opening, an upwardly extending cylindrical extension secured to said flanged portion and having a larger inside diameter than said tubular member to define a recess adjacent the upper end of said tubular member, a generally narrow elongated lower cross member extending diametrically across said tubular member and secured adjacent the lower end thereof defining a pair of generally half circular spaced fluid openings through the lower end of said tubular member, said lower cross member having a first bearing aperture therein axially positioned in relation to said tubular member, a generally narrow arcuate upper cross member disposed over the upper end of said tubular member and having side portions secured adjacent diametrically opposed points on the upper end of said tubular member, said upper arcuate cross member having a central portion secured between said side portions thereof and being spaced upwardly from the upper end of said tubular member defining laterally accessible openings into the upper end of said tubular member, said upper cross member having a second bearing aperture disposed axially in the central portion thereof in vertical alignment with said first bearing aperture, an indicator member having a stem slidably extending through said apertures and a float member secured adjacent the lower end of said stem below said lower cross member, and a transparent dome removably mounted on the upper end of said tubular member forming a closure for said fluid openings therein, said dome having generally cylindrical lower side walls positionable in said recess in engagement with the inside surface of said cylindrical extension, said dome having a vent opening therein.

2. A battery level indicator comprising, an externally threaded generally tubular member formed for generally vertical positioning and threaded engagement in a storage battery liquid access opening, a depending lower cross member extending diametrically across said tubular member and secured thereto adjacent the lower end thereof, said cross member having a first bearing aperture therein and defining at least one fluid opening through the lower end of said tubular member, said tubular member having an enlarged axial extension at the upper end providing an open topped recess, an upper cross member extending across said tubular member and secured thereto adjacent the upper end thereof, said upper cross member defining a fluid access opening into said tubular member and having a portion extending upwardly into the enlarged extension of said tubular member, said portion of the upper cross member having a second bearing aperture vertically aligned with said first aperture, an indicator member having a stem slidably extending through said apertures and a float secured adjacent the lower end of said stem, and a transparent dome with an upper tubular portion for the reception of said stem and an enlarged open bottomed portion removably fitting within the enlarged upper extension of the tubular member, said indicator member being confined in said tubular member for limited upward and downward movement relative thereto, and said indicator and tubular members being insertable or removable as a unit in or from the battery liquid access opening and independent of said closure dome.

3. A battery level indicator plug comprising, in combination, a generally tubular housing formed for generally vertical positioning in a storage battery liquid access opening and having an upper outwardly flanged portion for engagement with the upper surface of the battery, said tubular member having an externally threaded surface adjacent the lower end thereof for threaded engagement in said battery opening, an upwardly extending cylindrical extension secured to said flanged portion and having a larger inside diameter than said tubular member to define a recess adjacent the upper end of said tubular member, a generally narrow elongated lower cross member extending diametrically across said tubular member and secured adjacent the lower end thereof defining a pair of generally spaced fluid openings through the lower end of said tubular member, said lower cross member having a first bearing aperture therein axially positioned in relation to said tubular member, a generally narrow upper cross member disposed over the upper end of said tubular member and having side portions secured adjacent diametrically opposed points on the upper end of said tubular member, said upper cross member having a central portion secured between said side portions thereof and being spaced inwardly from the upper end of said tubular member and defining laterally accessible openings into the upper end of said tubular member, said upper cross member having an opening therein to provide a second bearing aperture disposed axially in the central portion thereof in vertical alignment with said first bearing aperture, an indicator member having a stem slidably extending through said apertures and a float member secured adjacent the lower end of said stem below said lower cross member, and a transparent dome removably mounted on the upper end of said tubular member forming a closure for said fluid openings therein, said dome having generally cylindrical lower side walls positionable in said recess in engagement with the inside surface of said cylindrical extension, said dome having a vent opening therein.

References Cited by the Examiner
UNITED STATES PATENTS 2,561,748 7/1951 Murphy _____ 136—182.2
2,886,624 5/1959 Krukowski _____ 136—182 X
3,170,325 2/1965 Sinclair _____ 73—306

FOREIGN PATENTS 414,555 6/1910 France.

LOUIS R. PRINCE, *Primary Examiner.*